United States Patent
Pfeifle

(10) Patent No.: US 10,030,985 B2
(45) Date of Patent: Jul. 24, 2018

(54) UPDATING NAVIGATIONAL MAP DATA

(71) Applicant: HERE Global B.V., Eindhoven (NL)

(72) Inventor: Martin Pfeifle, Seewald (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/419,306

(22) Filed: Jan. 30, 2017

(65) Prior Publication Data

US 2017/0138743 A1  May 18, 2017

Related U.S. Application Data

(63) Continuation of application No. 14/742,153, filed on Jun. 17, 2015, now Pat. No. 9,593,955.

(60) Provisional application No. 62/104,910, filed on Jan. 19, 2015.

(51) Int. Cl.
| | |
|---|---|
| G01C 21/34 | (2006.01) |
| G01C 21/32 | (2006.01) |
| G06F 17/30 | (2006.01) |
| G09B 29/10 | (2006.01) |

(52) U.S. Cl.
CPC ........... *G01C 21/32* (2013.01); *G01C 21/34* (2013.01); *G06F 17/30241* (2013.01); *G09B 29/106* (2013.01)

(58) Field of Classification Search
CPC ... G01C 21/34; G01C 21/32; G06F 17/30241; G09B 29/106
See application file for complete search history.

(56) References Cited

U.S. PATENT DOCUMENTS

| | | | |
|---|---|---|---|
| 7,672,778 B1 * | 3/2010 | Elliott | G01C 21/32 |
| | | | 701/102 |
| 8,060,699 B2 | 11/2011 | Strumpen et al. | |
| 8,386,715 B2 | 2/2013 | Fischer | |
| 8,750,845 B2 | 6/2014 | Iwuchukwu | |
| 9,075,822 B2 | 7/2015 | Richter et al. | |
| 2007/0200713 A1 | 8/2007 | Weber et al. | |
| 2007/0204218 A1 * | 8/2007 | Weber | G01C 21/20 |
| | | | 715/234 |
| 2009/0243925 A1 * | 10/2009 | Kellermeier | B60R 25/102 |
| | | | 342/357.64 |
| 2009/0248758 A1 * | 10/2009 | Sawai | G01C 21/32 |

(Continued)

FOREIGN PATENT DOCUMENTS

| | | |
|---|---|---|
| EP | 1643395 | 4/2006 |
| EP | 2626668 | 8/2013 |

OTHER PUBLICATIONS

Search Report and Written Opinion cited in PCT/EP2015/050922, dated Apr. 1, 2016.

(Continued)

*Primary Examiner* — Hussein Elchanti
(74) *Attorney, Agent, or Firm* — Alston & Bird LLP

(57) ABSTRACT

Systems, methods, and apparatuses are described for updating navigational map data. A routing request is received for routing data. A version compatibility matrix may be accessed that corresponds to the routing request. An analysis is performed of a cache database, a main database, and the version compatibility matrix. A number of version conflicts between the cache database and main database are identified based on the analysis. Using these version conflicts, one or more routes based on the routing request are generated.

20 Claims, 11 Drawing Sheets

(56) References Cited

U.S. PATENT DOCUMENTS

| | | | |
|---|---|---|---|
| 2011/0207446 A1 | 8/2011 | Iwuchukwu | |
| 2012/0209818 A1* | 8/2012 | Richter | G06F 17/30241 707/690 |
| 2012/0303263 A1 | 11/2012 | Alam et al. | |
| 2013/0117322 A1 | 5/2013 | Fischer et al. | |
| 2014/0344296 A1* | 11/2014 | Chawathe | G06F 17/30241 707/755 |
| 2015/0186443 A1* | 7/2015 | Ito | G06F 17/30241 707/618 |

OTHER PUBLICATIONS

U.S. Appl. No. 14/742,153, filed Jun. 17, 2015.
United States Patent and Trademark Office, Office Action for U.S. Appl. No. 14/742,153, dated Jun. 16, 2016, 11 pages, U.S.A.
United States Patent and Trademark Office, Notice of Allowance for U.S. Appl. No. 14/742,153, dated Nov. 1, 2016, 11 pages, U.S.A.

* cited by examiner

FIG. 1

UPDATING NAVIGATIONAL MAP DATA

RELATED APPLICATIONS

This application is a continuation under 37 C.F.R. § 1.53(b) and 35 U.S.C. § 120 of U.S. patent application Ser. No. 14/742,153 filed Jun. 17, 2015, which claims the priority benefit of U.S. Provisional Application No. 62/104,910, filed Jan. 19, 2015, which are incorporated by reference in their entirety. The entire contents of the provisional application are incorporated herein by reference, except that in the event of any inconsistent disclosure or definition from the present specification, the disclosure or definition herein shall be deemed to prevail.

FIELD

The following disclosure relates to updating navigational map data, or more particularly, systems and algorithms for updating, applying, and checking version dependencies for hybrid navigation.

BACKGROUND

Incremental map updating, hybrid navigation, and navigation data streaming are critical to modern navigation systems. The term hybrid navigation refers to a system in which some map data is cached at the mobile device, but the mobile device still relies on downloading map data from a server as the mobile device travels to new geographic areas. The area of highly automated driving (HAD) applications require reliable data. Reliability in this context has two aspects. First, the data must be fresh, i.e. up to date and current. Second, it must be consistent. For a database to be consistent the data contained in the database must be compatible with the other data in the database. This compatibility makes the data consistent, or dependable and when the data is accessed it produces expected results.

SUMMARY

Methods, apparatuses, and systems are provided which receive routing requests and determine version conflicts between data sets to provide updated navigational map data. A tile version compatibility matrix corresponds to the routing request. An analysis is performed of a cache database, a main database, and the tile version compatibility matrix. A number of version conflicts between the cache database and main database are identified based on the analysis. Using these version conflicts, one or more routes based on the routing request are generated. The route may be sent to an end user, a server, or some other system.

The following embodiments provide systems and methods for updating navigational map data. A method, apparatus, and system are provided which receives routing requests and determines version conflicts between data sets to provide updated navigational map data. A tile version compatibility matrix may be used that corresponds to the routing request. The tile version compatibility matrix may be used to indicate which version of tile data in the navigational map data is current and consistent with other tile data in the navigational map data. An analysis is performed of a cache database, a main database, and the tile version compatibility matrix. A number of version conflicts between the cache database and main database are identified based on the analysis. Using these version conflicts, one or more routes based on the routing request are generated. The route may be sent to an end user, a server, or some other system.

In one embodiment, an end user wishes to update navigational map data while routing to a destination. The navigation application may receive a routing request for routing data. The routing data corresponds to tile data in a navigational map. The navigation application may access a tile version compatibility matrix. The tile version compatibility matrix may contain versioning information about the tile data in the navigational map. The navigation application may perform an analysis of a first database, a second database, and the tile version compatibility matrix. The first and second database may consist of tile data. The navigation application may identify a number of version conflicts between the first and second databases based on the analysis. The version conflicts indicate that two tiles are not consistent with each other. The navigation application may generate a route based on the routing request and the number of version conflicts.

In another embodiment, a non-transitory computer readable medium is operable to execute instructions for updating navigational map data. The instructions when executed receive a route request for routing data, access a tile version compatibility matrix, perform an analysis of a cache database, a main database, and the tile version compatibility matrix, identify a number of version conflicts between the cache and main databases based on the analysis, and generate a route based on the route request and the number of version conflicts.

BRIEF DESCRIPTION OF THE DRAWINGS

Exemplary embodiments are described herein with reference to the following drawings.

FIG. 1 illustrates an example way of storing data for updating navigational map data when a system has no internet connection.

DETAILED DESCRIPTION

Figure 2:
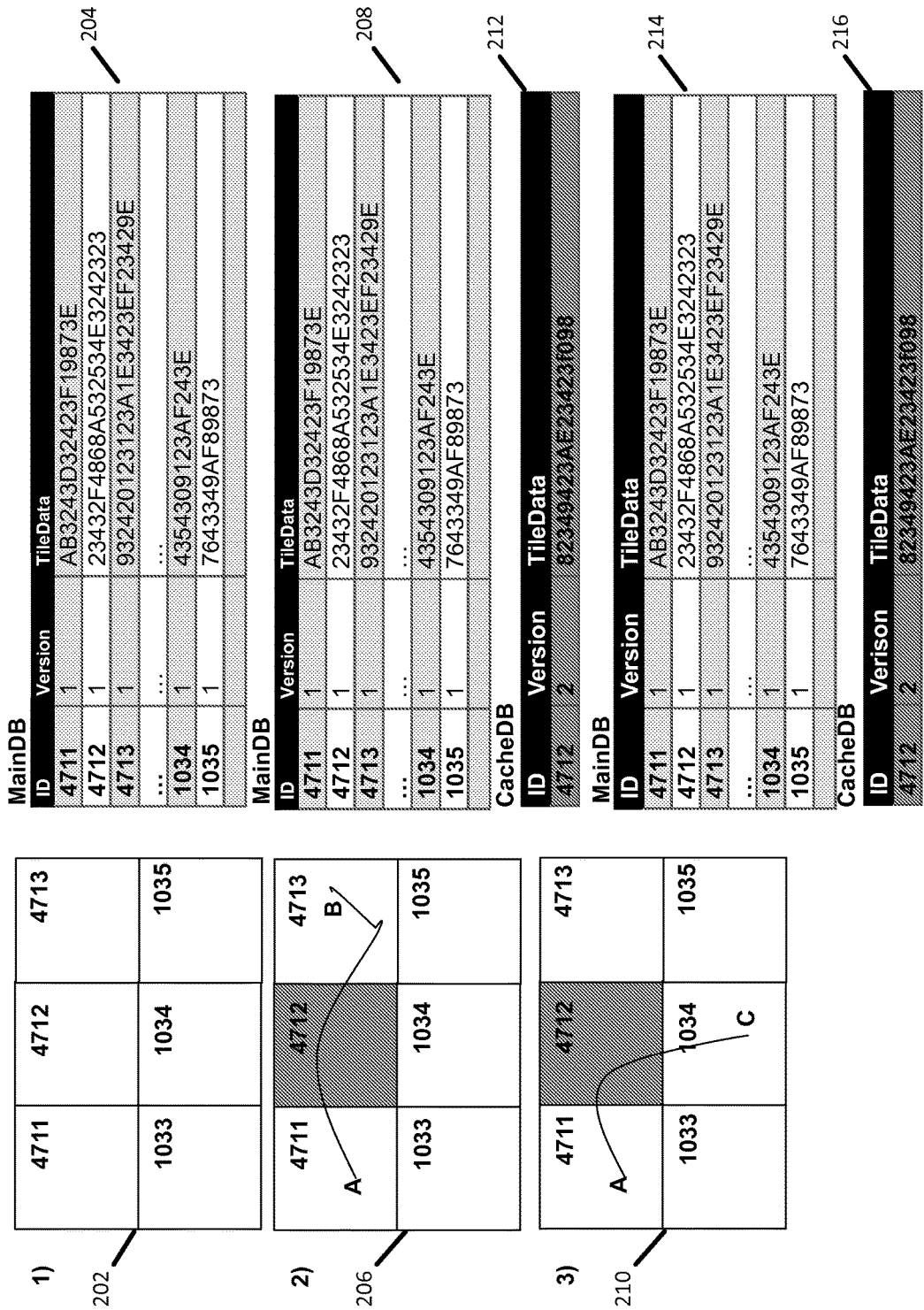
FIG. 2 illustrates an example of storing data navigational map data when a system has a network connection.

Modern navigation systems use versioning to address freshness and consistency. Often navigation content is used in tiles. The tiles have a version and are stored in a database (such as a SQLite database) as binary large objects (BLOBs).

For instance, routing data is stored in a table, for example in a RoutingTileTable which may have three attributes (ID, Version, TileData). The ID reflects the spatial position of the data, the version reflects the versioning information, and the TileData contains the binary encoded navigation data, or BLOB data, of that particular region. The process of building a map for use by a navigation device requires compiling the map and downloading the map to the navigation device. After having compiled a complete map from scratch, all tiles in the table have the same version, i.e. version one. Maps are typically compiled at a region level, for example, a map of Germany, the State of Illinois, or similar geographic region. If a navigation device, e.g. a navigation head unit in a car, is updating the compiled database from one version to another, the navigation device has to update all tiles which have a later-version ID. Only the version of the changed tiles is increased. If all tiles have been updated, the updated database is again fresh and consistent. Unfortunately, updating all tiles of a complete product, e.g. Europe or at least Germany, is a rather costly operation. It requires a lot of over the air bandwidth and it takes quite some time to update the database on the client.

The following embodiments relate to a method to update navigational map data. Updating navigational map data historically is achieved by maintaining a network (e.g., internet) connection between a navigation application and a server. The navigation application may download parts of the map at regular intervals. However, downloading the entire map may take significant time and bandwidth. A tile version accessibility matrix may be used to address the problem of updating navigational map data when there is no internet connection between a navigation application and a server which houses map data.

Figure 1:
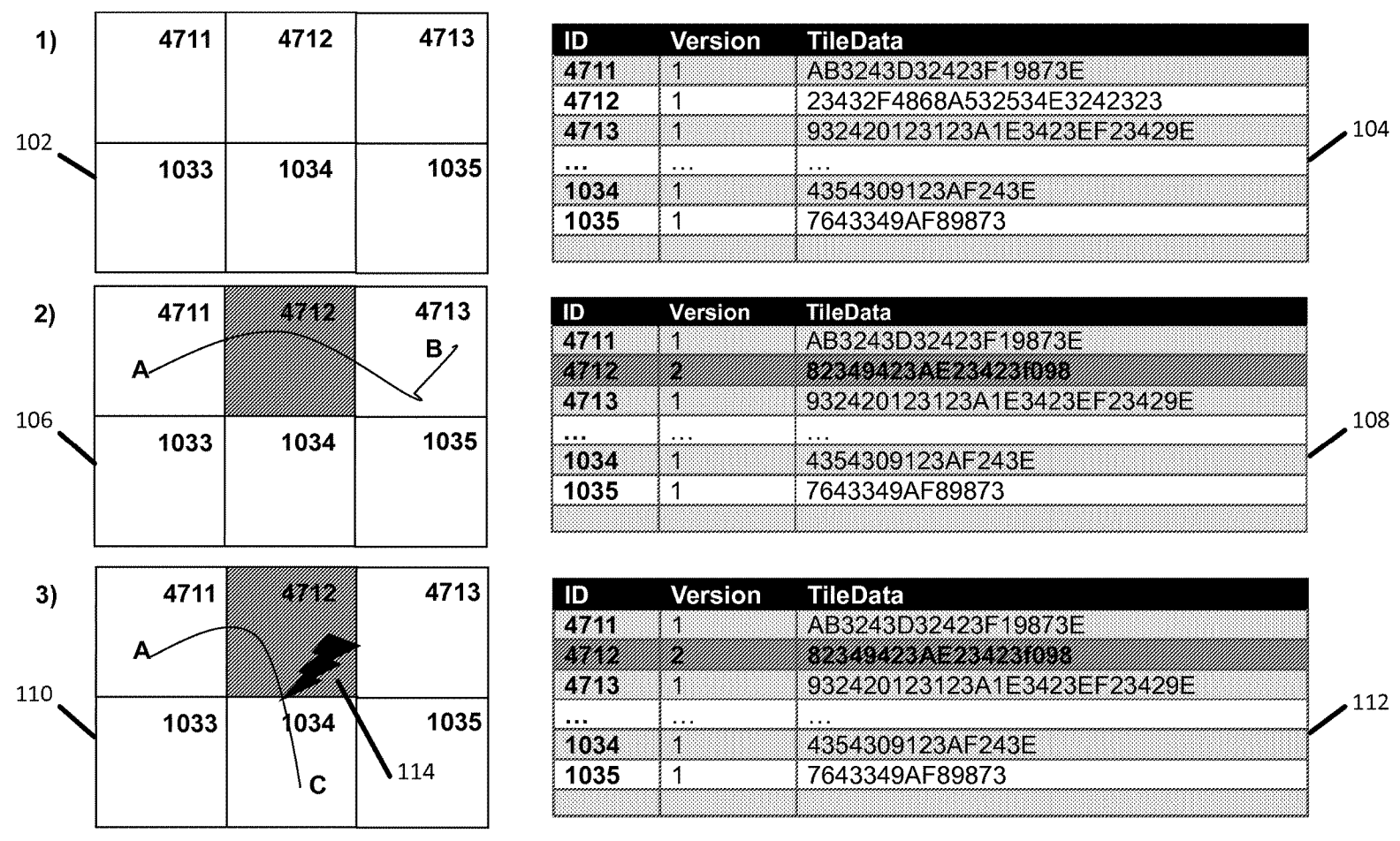

FIG. 1 illustrates an example way of storing data for updating navigational map data when a system has no internet connection. FIG. 1 includes a set of tiles 102 section (1), the tiles corresponding id, version number, and data at table 104, the same set of tiles 106 section (2) with a potential route over them, the tiles corresponding id, version number, and data with a changed version number and data for tile 4712 at tables 108 and 112, and a potential route over the set of tiles at 110. One approach to limiting the amount of data that needs to be downloaded is to download only the area that a navigation device is currently traveling in. Assume a navigation device computes a route from A to B and uses only three tiles in the process. For example, the route from A to B in FIG. 1, section (2), includes three tiles (4711, 4712 and 4713).

In computing the route the navigation device may query a system for current data only for these three tiles and consequently update only these tiles, and only if those tiles have changed. For example, in FIG. 1 between sections (1) and (2), tile 4712 has changed. Because there is an internet connection, the route may be calculated because tile 4712 in the database 108 has been updated. If the navigation device later computes a route from point A to point C, and for whatever reason, the navigation device has no internet connection (cellular or other wireless) available as shown by the lightning bolt at 114, the navigation device may consult a database and determine that tile data is not consistent, which means that computing such a route is not possible anymore as the database is inconsistent, as shown by FIG. 1, section (3). The inconsistency is caused because tile 4712 may have a reference to a new version of tile 1034, which is not in the database 108. In other words, the version 2 of tile 4712 is consistent with version 1 of tiles 4711 and 4713 because routing was done with an internet connection in FIG. 1, section (2). However, no determination can be made whether version 2 of tile 4712 is consistent with version 2 of tile 1034 because the routing was done without an internet connection. Consequently, routing will not be possible. Stated more generally, one tile may have a reference to a new version of another tile, which is not in the database, and consequently routing may not be possible.

In one embodiment, the high definition database used for highly-automated driving does not get updated or changed at all. So the database stays consistent. All new data which is downloaded is stored in a second database, called the cache database, having the same structure as the original database. Having the same structure may be defined as having a tile id column, tile data column, and tile version column. The navigation device may attempt to establish an internet connection through a network device such as the network device in FIG. 4, 8, or 10. In case there is an internet connection available, the navigation device sends a request to download fresh tiles of the area it is currently using from the system. The merging of the newly downloaded tiles stored in the cache database and the tiles stored in the main database is done in the navigation application. Merging may include the navigation device checking database entries in the main database against the cache database to determine if the tile versions are consistent with each other. The navigation device may then build a route for a request using both tile data in the cache database and tile data in the main database that have been merged together to build the route. In case there is no internet connection available, the database reverts to using the original unchanged database. Thus, current data can be used if there is an internet connection available, and consistent data can be used if there is no internet connection.

FIG. 2 illustrates this scenario in the context of the example of FIG. 1. FIG. 2 consists of a group of tile data 202, a main database as shown by the tables 204, 208 and 214, a set of tile data with a potential route over the sets of tiles at 206 and 210, and a cache database 212 and 216. In FIG. 2, section (2), when there is an internet connection available, new data is downloaded to the cached database, having the same structure as the original one. In case there is no internet connection available, it reverts to using the original unchanged database. In FIG. 2, section (3), when there is no internet connection available, the original database is used for routing from point A to point C without using version 2 of tile 4712. Thus, fresh data can be used if there is an internet connection available and consistent data can be used if there is no internet connection.

Figure 3:
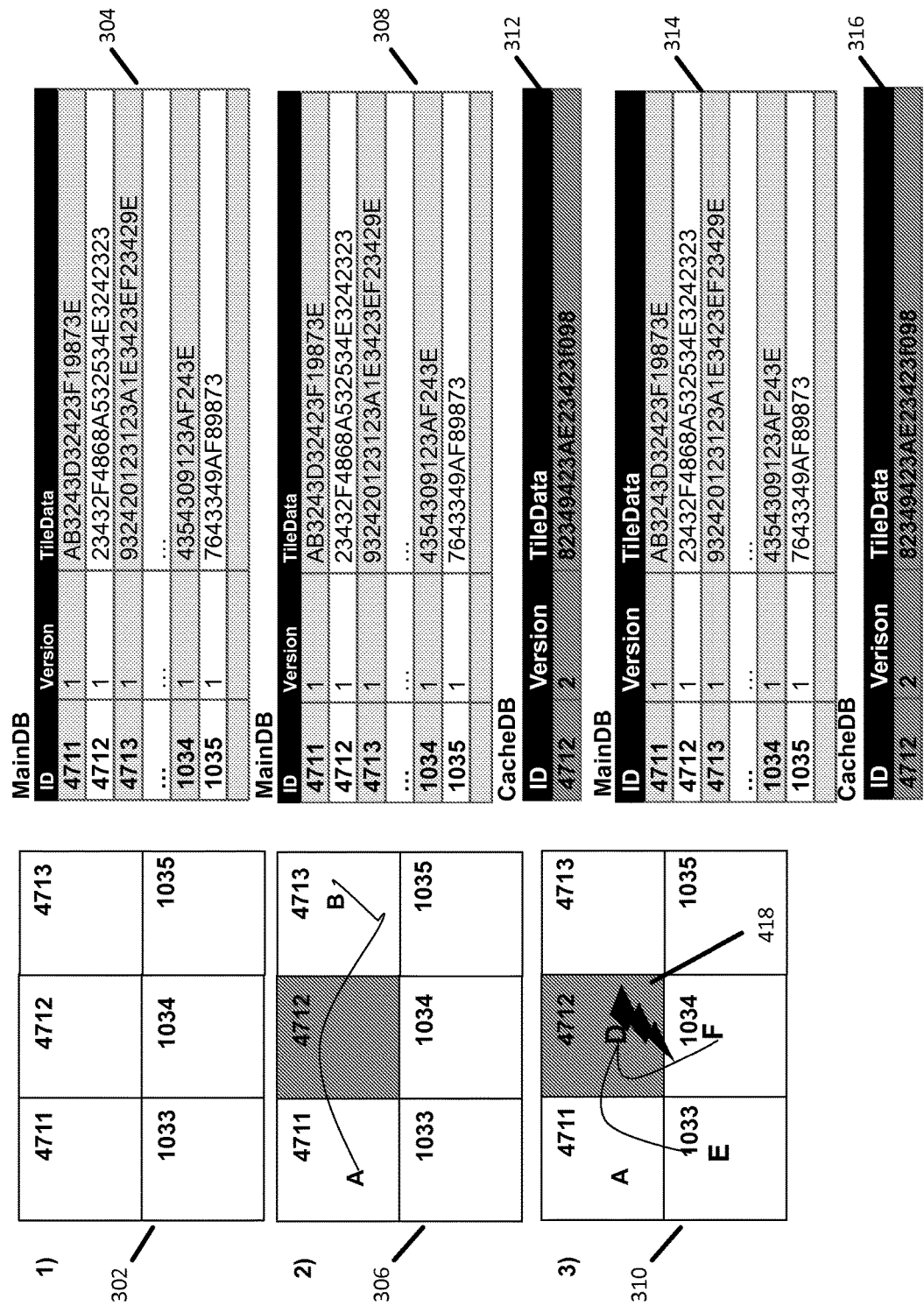
FIG. 3 illustrates an example system for updating navigational map data when a system has no network connection.

The unavailability of the cached database when there is no internet connection available is limiting. FIGS. 2 and 3 make use of a cache database to when there is no internet connection. For example, assume a route is computed from point A to point B in FIGS. 2 and 3, while the navigation device has an internet connection. The route covers three separate tiles 4711, 4712, and 4713, on the path from point A to point B. The tiles 4711, 4712, and 4713 may correspond to geographic data part of a map of a region of interest. In calculating the route, the system needs to check if any newer tile version stored in the cache database can be used in computing the route, or whether the system has to revert to using the consistent version of the main database. In this example, if the tile 4712 has a new version it is downloaded for the route calculation from point A to point B. The system denotes that the new version of 4712 is compatible with 4711 and 4713 because the tiles 4711 and 4713 are part of the route. If a user of a navigation device requests a route from point A to point C. This new route may route the user of the navigation device from tile 4711 to tile 1034. Unfortunately, the navigation device does not have an internet connection at geographic location for tile 1034, so the system reverts to the consistent database which does not include the new version for tile 4711 because it is not compliant with tile 1034.

In the case of "no internet connection," it is possible that routes should use some tiles from the cache database and some tiles from the main database. However, it is also not guaranteed that the set of tiles from the cache database are consistent to each other. It could be that the tiles stored in the cache database are from different consistent database compilations. If tiles from different database compilations are used together in one routing operation, the operation may result in an error. This is true whether the tiles are loaded from a combination of main database and cache database or only from the cache database. A solution is needed to detect whether the tiles stored in the cache database can be used (on with each other or in combination with the main database) if no internet connection is available.

Figure 4:
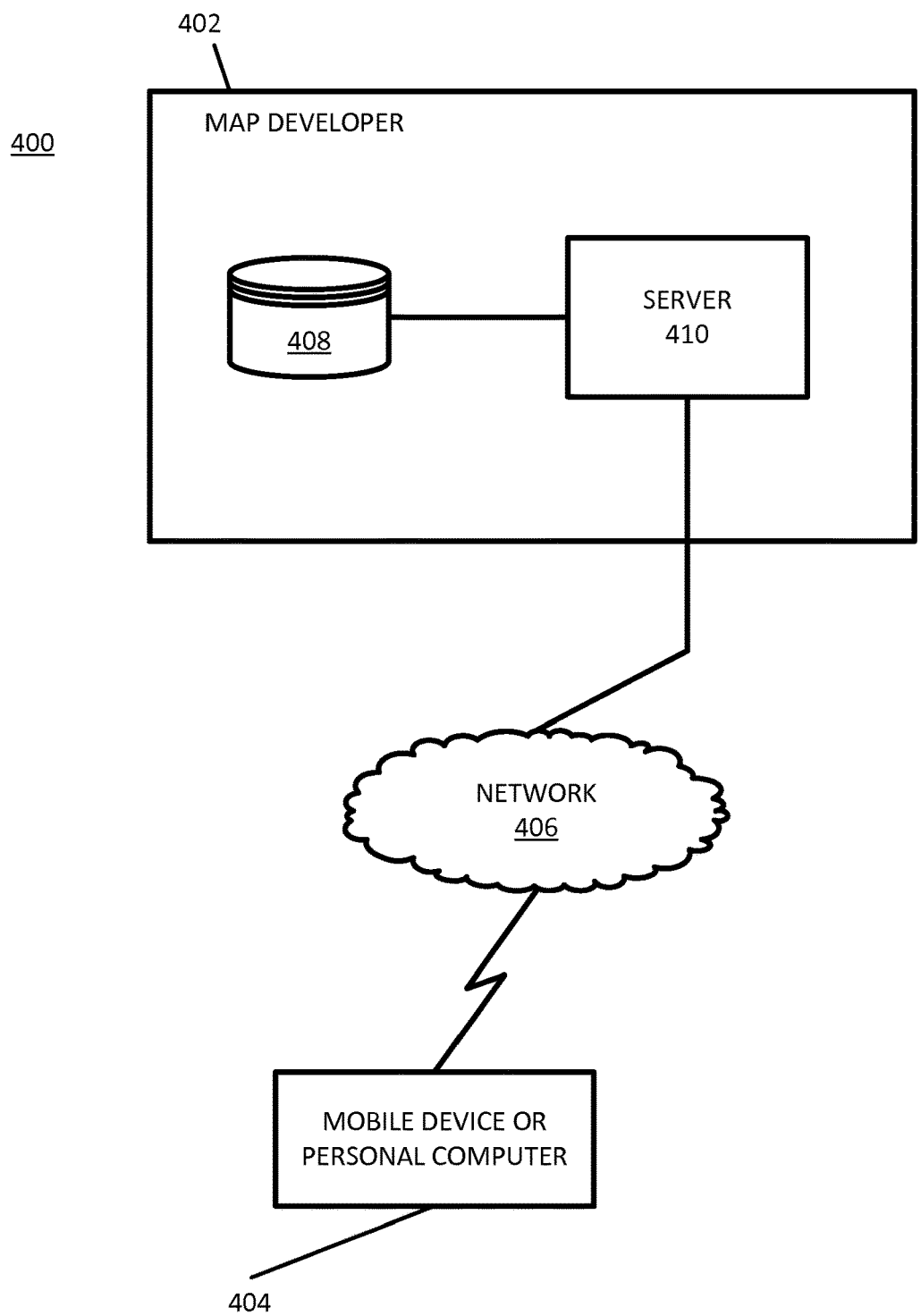
FIG. 4 illustrates a system for using a tile version compatibility matrix for updating navigational map data regardless of network connection.

FIG. 4 illustrates an example system 400 for updating navigational map data using a tile version accessibility matrix regardless of internet connection. The system 400 includes a developer system 402, one or more mobile devices or personal computers 404, hereinafter "mobile device", and a network 406. Additional, different, or fewer components may be provided. For example, many mobile devices 404 connect with the network 406. The developer system 402 includes a server 410 and one or more databases 408.

Database 408 may be a geographic database that stores navigational map data collected from one or more mobile devices 404, or navigational map data stored in the database 408 as part of the map developer system 402. The navigational map data may include tile data, route data, road data, link data, or historical traffic data that are stored in a table in the database 408. Tile data may refer to data collected by a vehicle, or individual, driving routes in the real world. Tile data may also refer to data that when constituted together make up the map data for a region of a map such as a city, state, county, country, or some combination thereof. The tile data stored in the database 408 may be data related to one or more vehicles traveling along a route or routes. A user of the mobile device may indicate that they wish to receive routing data from point A to point B. The tile data may indicate whether or not road links between adjacent tiles are compatible with each other, and thus able to form a route when pieced together. Additionally, the tile version compatibility matrix may indicate that any tiles stored in the database 408 are compatible with each other. The database 408 may include a main database and a cache database.

Figure 5:
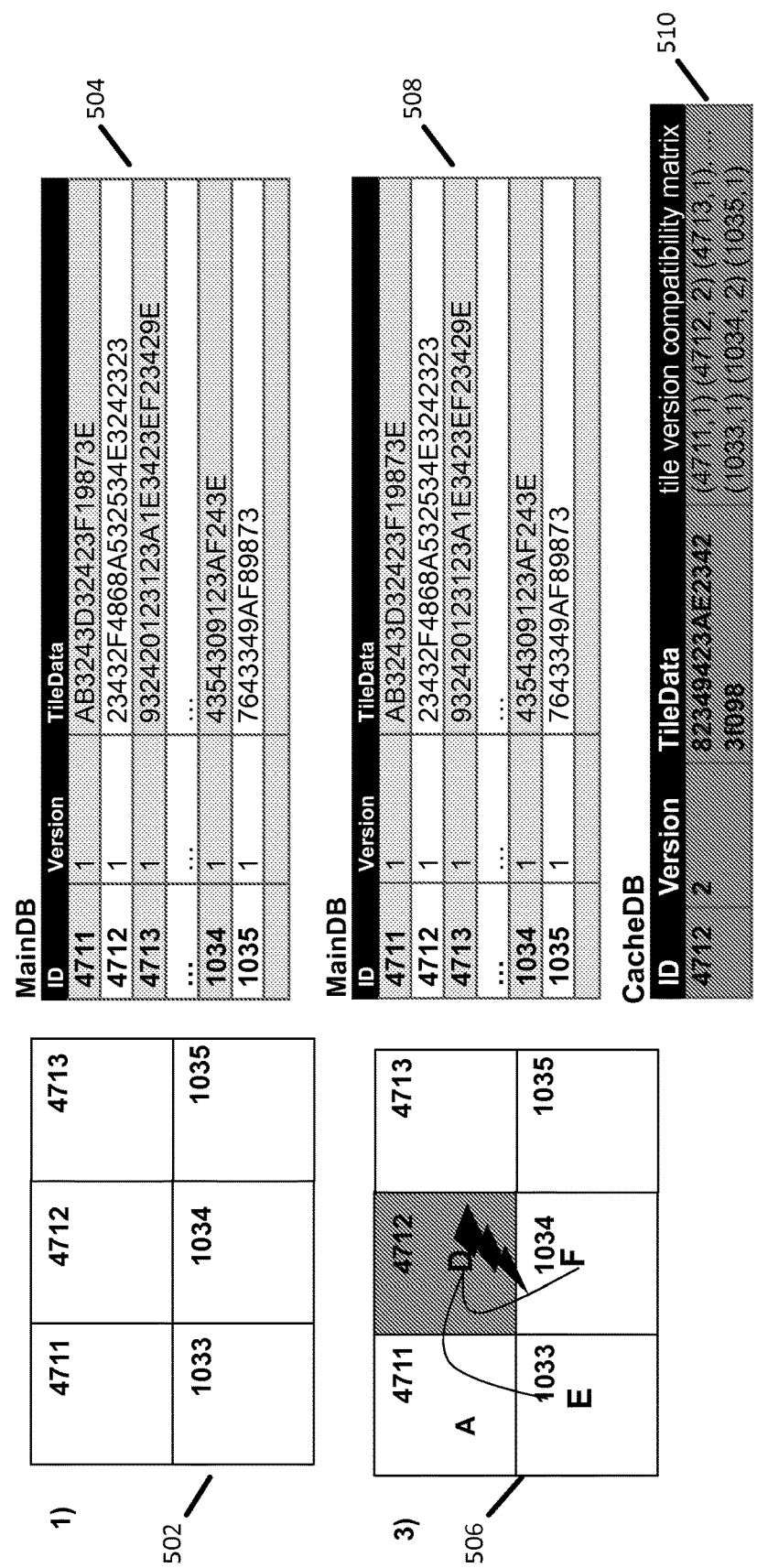
FIG. 5 illustrates an example database and a tile version compatibility matrix for updating navigational map data.
Figure 6:
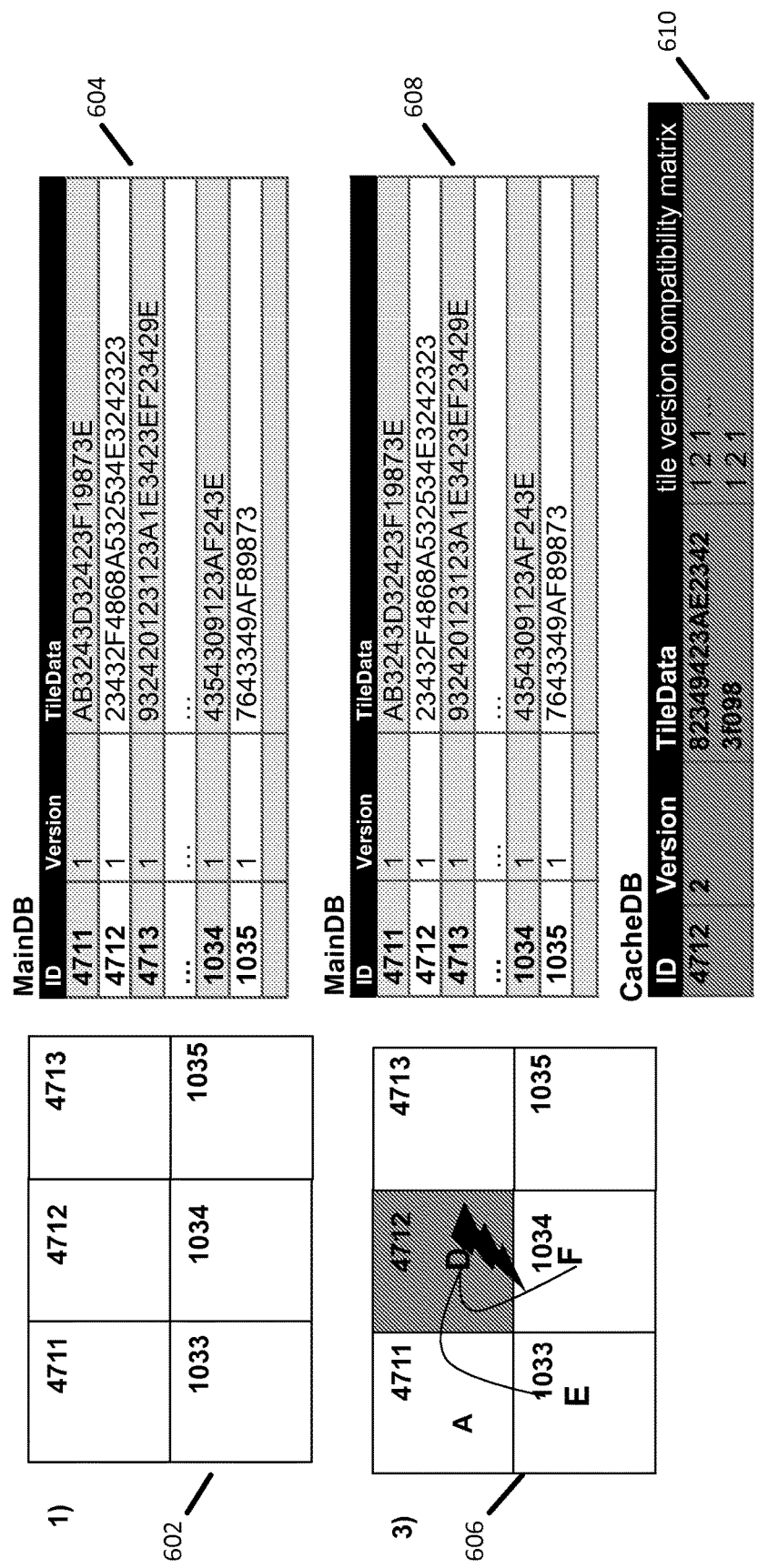
FIG. 6 illustrates another embodiment to store data in a tile version compatibility matrix for updating navigational map data.
Figure 7:
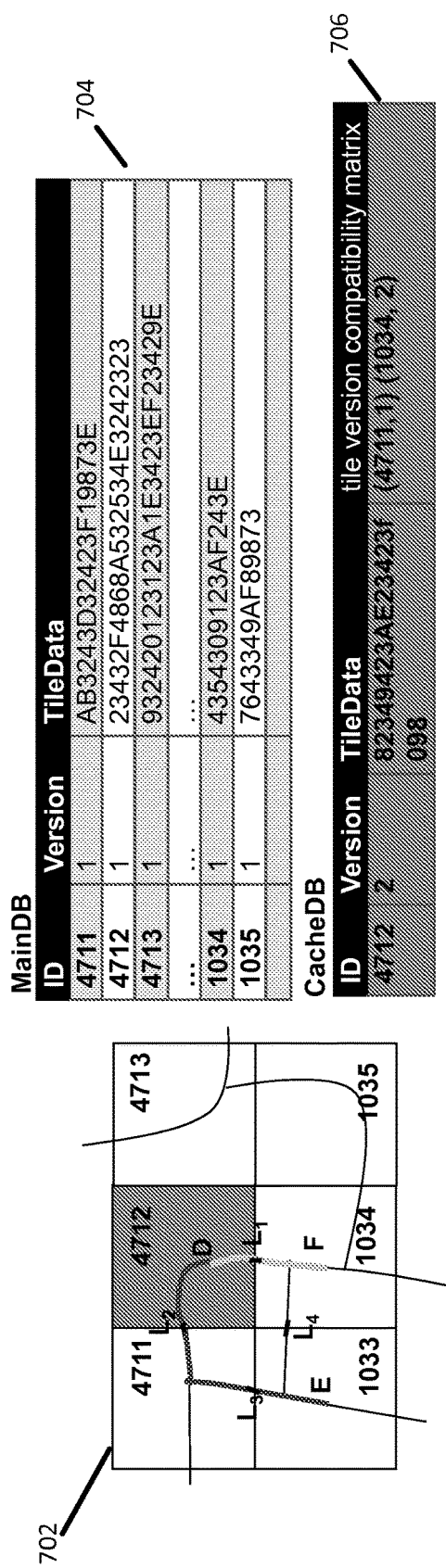
FIG. 7 illustrates yet another embodiment to store data in a tile version compatibility matrix for updating navigational map data.

One embodiment includes a tile version compatibility matrix calculated at the server 410. The tile version compatibility matrix may be an additional attribute for tile data downloaded to the mobile device 404 and stored in the cache database. The attribute may be a matrix where the tiles that are compatible with the tile data are listed. The listing of the compatible tiles may be a set of data including the tile data id and the tile data version that is compatible with the tile data entry. Examples of the databases and tile version compatibility matrix are depicted in FIGS. 5, 6, and 7.

The system 400 may receive a routing request for routing data. The routing data may contain tile data which may be used to build a map of a region of interest, such as a city, county, state, region, country, or some combination thereof. In other embodiments the mobile device 404 receives the request. The request may come from an end user of the system, such as a driver in a vehicle with a navigation application. Alternatively the request may come from a server. The routing request may correspond to an address, a building, a landmark, a point of interest, or some other geographic identifier stored in the database 408.

The system 400 may access a tile version compatibility matrix to determine if the tile data in memory or in a database is consistent. In other embodiments the mobile device 404 accesses the tile version compatibility matrix. In some embodiments the tile version compatibility matrix is stored on the mobile device 404, in other embodiments the tile version compatibility matrix is stored on the server 410 or database 408. The tile version compatibility matrix includes a flag or another type of data that indicates which tiles stored on the mobile device, or server or database, are compatible. In one example, a matrix is included for each tile and lists the tile identifiers and version numbers of neighboring or connectable tiles. Two tiles are connectable when a road segment, or road link, extends between the two tiles. In another example, a master matrix may include all tiles and consistencies of the entire geographic region. When two tiles are consistent, the tiles are available to the system for generating a route.

The tile version compatibility matrix may indicate which versions of tiles are compatible with other versions of tiles. This information might come from regular monthly or quarterly compilations of a geographic database stored on the mobile device or server, or database. The tile version compatibility matrix may be implemented as an additional attribute in a database entry for a particular tile.

The tile version compatibility matrix may contain the compatibility for all of the tile data corresponding to a region of interest. In another version the tile version compatibility matrix may contain only tile data corresponding to routing connections that are possible from that particular tile (i.e., each tile has a matrix). The order that tiles are referenced in the matrix may be determined in advance by the system, so the version information may be preordered. By preordering the tile data the tile version compatibility matrix may be smaller in size than storing the tile id and version data in the tile version compatibility matrix.

In one embodiment, the tile version compatibility matrix may store the full content, i.e. all pairs of tileID and versionID. In another embodiment, because the list of tileIDs might be stored in the metadata as well, it might be enough to store only the sequence of versions. The tile version compatibility matrix may include only the series of versions numbers. For example, the version compatibility matrix (M) may be [1, 1, 1, 2, 1, 1, 2], where each element in the matrix M indicates a version number for tileIDs in the sequence already stored in the metadata. An example of this is illustrated in FIG. 6. The sequence may be compressed by a compression algorithm such as the deflate algorithm which uses a sliding window compression and uses a binary tree of nodes (e.g., zlip), or a compression algorithm that uses a Burrows-Wheeler transformation, which is reversible, and rearranges strings into an order of similar characters (e.g., bzip2a), or some other compression algorithm.

In another embodiment, the matrix may be even more condensed because the list of sequence numbers includes a lot of values having the same value. The tile version compatibility matrix for each tile from the first compilation may include a sequence of 1-values for all other tiles in the database. Even if the number of tiles in the database were up to several thousand, the compressed tile version compatibility matrix could be a few bytes or as small as 2 bytes.

The tile version compatibility matrix may be limited to only those tiles which are connected to each other by a road link. An example of this process is shown in FIG. 7. By limiting the tile version compatibility matrix to only those tiles which are connected by a road link, the system, such as the system 400 in FIG. 4, does not need to check for inconsistencies in the version data between links that are not connected to each other.

The system 400 may perform an analysis of a first database, a second database, and the tile version compatibility matrix. In other embodiments the mobile device 404 performs the analysis. In some embodiments the first database is a cache database. A cache database may be a database where information is stored temporarily before the information is integrated into another database. Similarly, in some embodiments the second database may be a main database relied upon by the system or mobile database. The database may include all of the most recent complete map data downloaded. The analysis may compare the data stored in the databases to the data stored in the tile version compatibility matrix.

The system 400 may identify a number of version conflicts between the first and second databases based on the analysis. The version conflicts may, for example, be a situation where one tile stored is in the database 408, or the mobile phone 404, has a version id of 1, and the updated version of the tile stored in the cache database has a version id of 2. In this situation the tile version compatibility matrix for the adjacent tile may indicate that the adjacent tile is only compatible with version 1. Therefore, there would be a version conflict the adjacent tile with the tile stored in the cache database.

The system 400 may generate a route based on the routing request and the number of version conflicts. In other embodiments the mobile device 404 may generate the route. The route may correspond to a path that an end user may use to travel from point A to point B. The route may also be generated from the first database alone. In other embodiments the route is generated form the second database alone. In some embodiments, if there is an internet connection to the mobile device 404 the route is generated using both the first and second databases, as well as the tile version compatibility matrix. In yet other embodiments, if there is no internet connection the route is generated using both the first and second databases as well as the tile version compatibility matrix. The route may be sent to a mobile device by the server, or in other embodiments the route is sent from the mobile device to the server.

FIG. 5 is an example of one embodiment of the tile version compatibility matrix. The example shows one set of tile data 502, a main database as shown in tables 504 and 508, a potential set of routes over the tile data 506, and a tile version compatibility matrix 510. For example, a tile such as tile 4712, may have the following attributes id, version, tile data, and a tile version compatibility matrix. Tile 4712 may have the following values, id=4712, version=2, tile data=82349423AE23423f098, and tile version compatibility matrix=(4711,1),(4712,1),(4713,1), . . . (1033,1),(1034,2),(1035,1). The values of the tile version compatibly matrix indicate that tile 4712 version 2 is compatible with tile 4711 version 1, tile 4713 version 1, tile 1033 version 1, tile 1034 version 2, and tile 1035 version 1. Any routes that need to be calculated along those tiles may be done so without an internet connection. If a user attempts to route from point D to point E, which would require a trip to 1033, the system would see from the tile version compatibility matrix that version 1 of tile 1033 was required. If version 1 of tile 1033 was not in the main database or the cache database then the routing may not occur. In FIG. 5, version 1 of tile 1033 is in both the main and cache database so routing may occur, regardless of internet connection. If however, routing is supposed to go from D to F, and there is no internet connection, routing may not occur because the tile version compatibility matrix 510 indicates that 4712 is compatible with tile 1034 version 2, but the main database only has version 1 of tile 1034.

FIG. 6 is an example of the tile version compatibility matrix using the same data as FIG. 5, but in FIG. 6 the tile version compatibility matrix 610 contains only version ids, such as 1, 2, 1, . . . 1, 2, and 1. In this embodiment the order of tile ids is stored in metadata accessible by the navigation application, and thus allows the navigation application to store only the tile id version. Then when the routing algorithm is run the amount of resources required to process the algorithm is reduced.

FIG. 7 illustrates an example of the tile version compatibility matrix limited to only those tiles which are connected to each other by a road link. For example, a routing request from D to E is received. The potential routes are illustrated at the tile data group 702. The routing algorithm starts at point D in tile 4712. The system analyzes the links, and the routing algorithm will come to the tile borders for tile 4712. Tile 4712 has Link L1 and Link L2. The algorithm may check the main database 704 to see what the version information is for the various tiles. The algorithm cannot continue at Link L1 because tile 1034 has a version value of 2 according to the tile version compatibility matrix 706 for tile 4712, and tile 1034 version 2 is not available in the main database. So the algorithm stops at Link L1.

Next the algorithm continues at Link L2 in the other direction. As tile 4711 with version 2 is consistent to tile 1033 with version 1, the algorithm can continue. The algorithm identifies Link L3 which is in tile 1033. As the current tile 4711 is taken from the main database and tile 1033 is also available in the main database only, tiles 4711 and 1033 are compliant with each other and routing can continue to the destination C.

As the algorithm was "blocked" once by a version incompatibility (in the above example at Link L1), the system computes the same route again based on the main database only. Next the route using the main database only and the route using the combined cache database and main database are compared to each other and the better one is used as a result.

For example, a routing request from D to F is received. The routing algorithm starts at point D. The system analyzes the links, and the routing algorithm will arrive at Links L1 and L2 and can only continue with Link L2. It is still possible to compute a route from D to F via Links L1, L3 and L4 using the data from Tile 4712 with Version 2. As the routing was blocked, the navigation device may also compute the route from D to F on the main database and compare the result with the result from using the combined main database and cache database.

The system may determine which is the better one by route speed, route time, route traffic level, or some other metric. The system may calculate route speed by measuring average travel speed along the calculated route. The system may calculate route time by measuring average travel time along the calculated route. The system may calculate the traffic level by communicating with traffic nodes that record the level of traffic along the route. The system may then compare the speed, time, and traffic and based on past usage of the navigation device determine the best possible route.

The tile version compatibility matrix may be downloaded by a navigation device on a regularly scheduled time interval, such as daily, weekly, monthly, quarterly, or as routing requests are received. During downloading the navigation device may only download a tile version compatibility matrix for those tiles which are compatible with other tiles.

Figure 8:
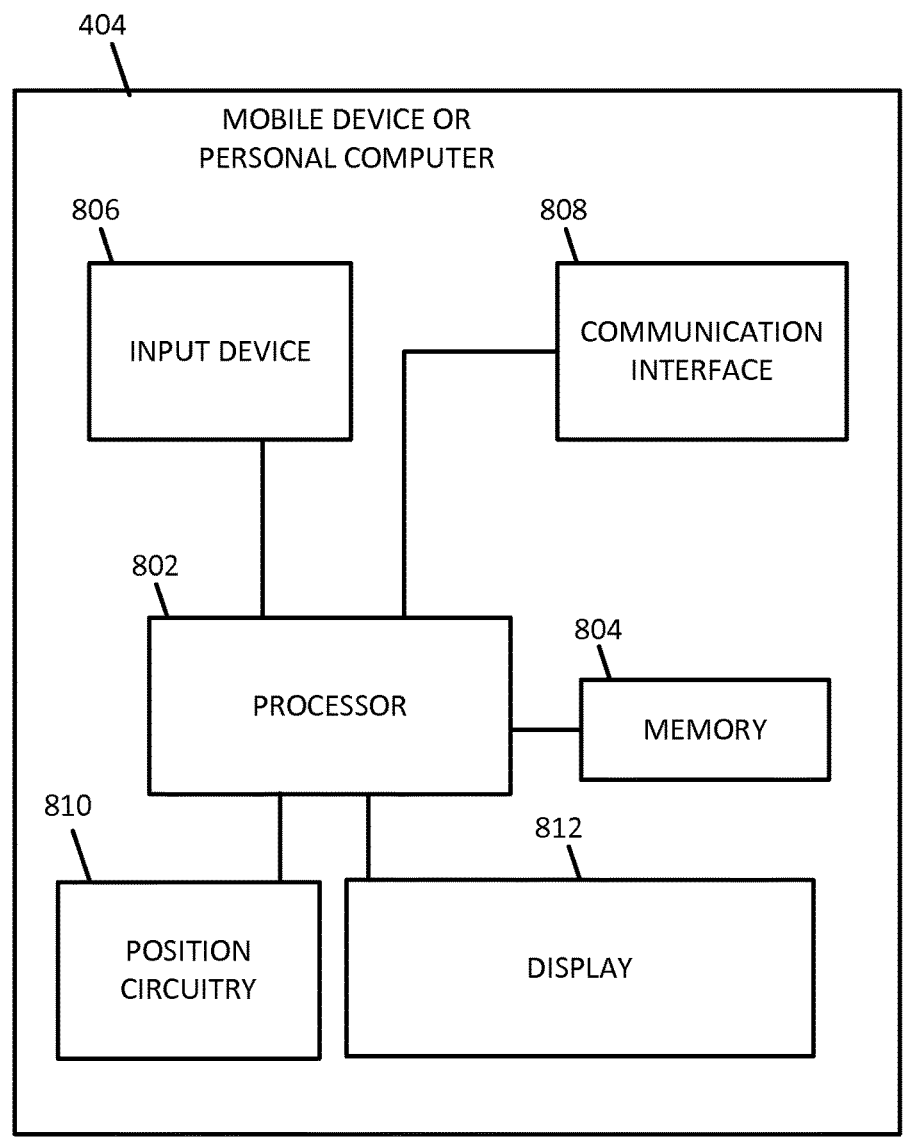
FIG. 8 illustrates an example mobile device for updating navigational map data.

FIG. 8 shows an example mobile device or personal computer 404 that may be used as a navigation device. FIG. 8 includes a processor 802, a memory 804, an input device 806, a communication interface 808, a position circuitry 810, and a display 812. Additional, different, or fewer components are possible for the mobile device/personal computer 404. The mobile device 104 may be a personal device such as a mobile phone equipped with position circuitry (e.g., global positioning system (GPS)) and an inertial measurement unit (IMU). The position circuitry 810 generates data indicative of the location of the mobile device 404 ("position data"). In addition or in the alternative to GPS, the position circuitry may include a dead reckoning-type system, cellular location, or combinations of these or other systems. The positioning circuitry may include suitable sensing devices that measure the traveling distance, speed, direction, and so on, of the mobile device 104. The positioning system may also include a receiver and correlation chip to obtain a GPS signal.

Figure 9:
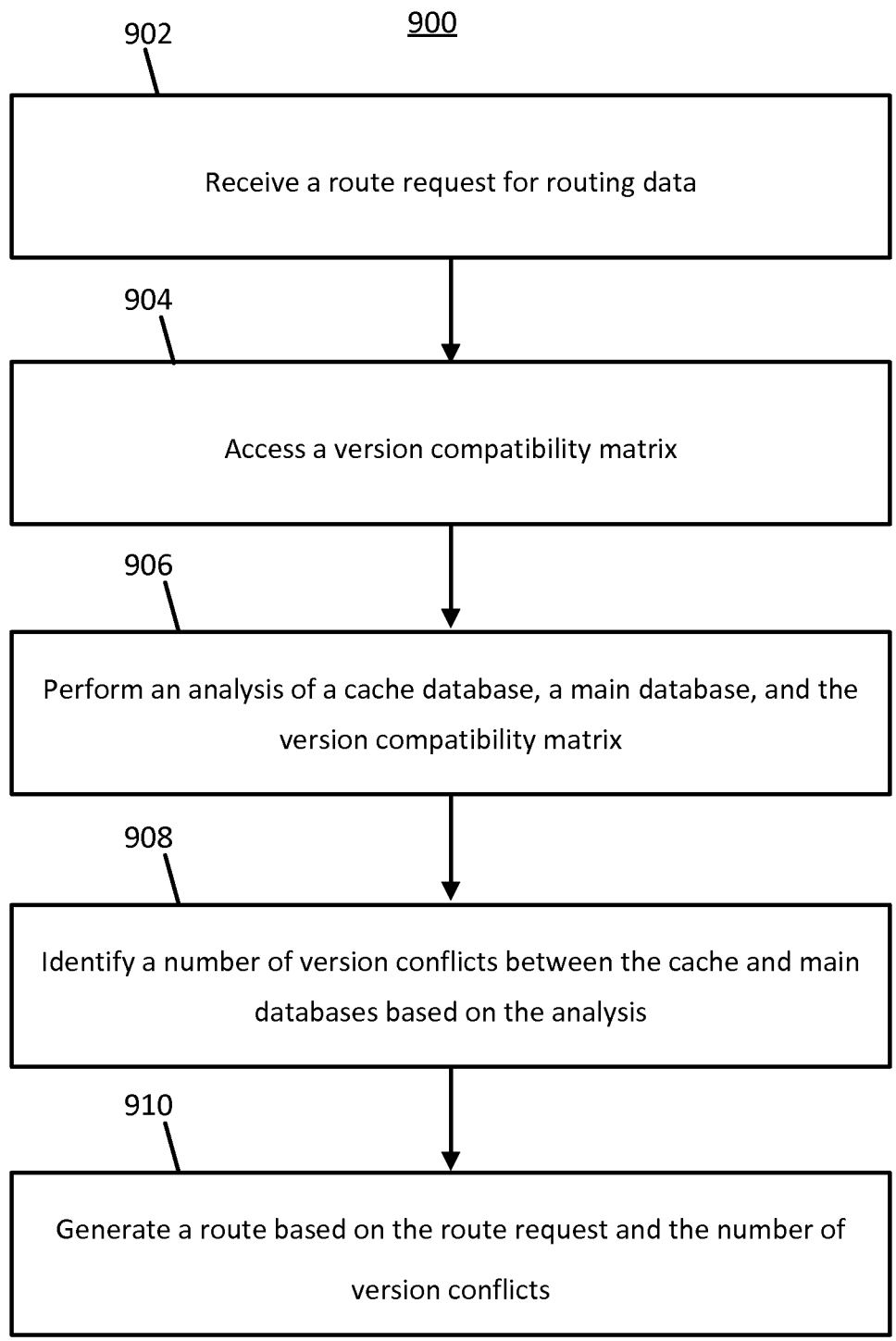
FIG. 9 illustrates an example flowchart for updating navigational map data.

FIG. 9 illustrates an example flowchart for updating navigational map data by using a tile version compatibility matrix. The acts may be applied in a different order. Acts may be omitted or repeated. Additional acts may be added. At act 902, the processor 802 or the communication interface 808 may be configured to receive a route request for routing data. The route request may be input by the position circuitry 810, the input device 806, a GPS, or other input device integrated with the mobile device 404. At act 904, the processor 802 may access a version compatibility matrix. In one embodiment, the version compatibility matrix may take the form of the table below:

| Tile Number | |
| --- | --- |
| Compatible Tile | Version |

In the above table the top row corresponds to a particular tile number which is used to identify a tile data entry in the navigational map database. The column on the left identifies other tiles in the navigational map database that are compatible with the tile number. The column on the right indicates which version of the compatible tile is compatible with the tile number. The example table may have more rows, and list multiple compatible tiles that are compatible with the tile number. Additionally, multiple columns beyond compatible tile and version may be included. For example, the corresponding geographic tile data for compatible tiles may be included.

At act 906, the processor 802 performs an analysis of a cache database, a main database, and the version compatibility matrix. The processor may perform this step in conjunction with the memory 804. In some embodiments the processor may check the rows of the version compatibility matrix to see what tiles are compatible with the tile data along the route. The processor may check the columns of the version compatibility matrix to see which version of the tile is compatible. The processor may check the cache database and main database to make sure that this version of the tile is in one of the databases.

At act 908, the processor 802 identifies a number of version conflicts between the cache and main databases based on the analysis. The version conflicts may occur if the tiles listed in the tile version compatibility matrix have a different version listed than the tiles listed in the cache database or main database.

At act 910, the processor 802 generates a route based on the route request and the number of version conflicts. The processor may generate the route using the cache database and main database, the cache database alone, the main database, alone, or some other combination of databases.

Figure 10:
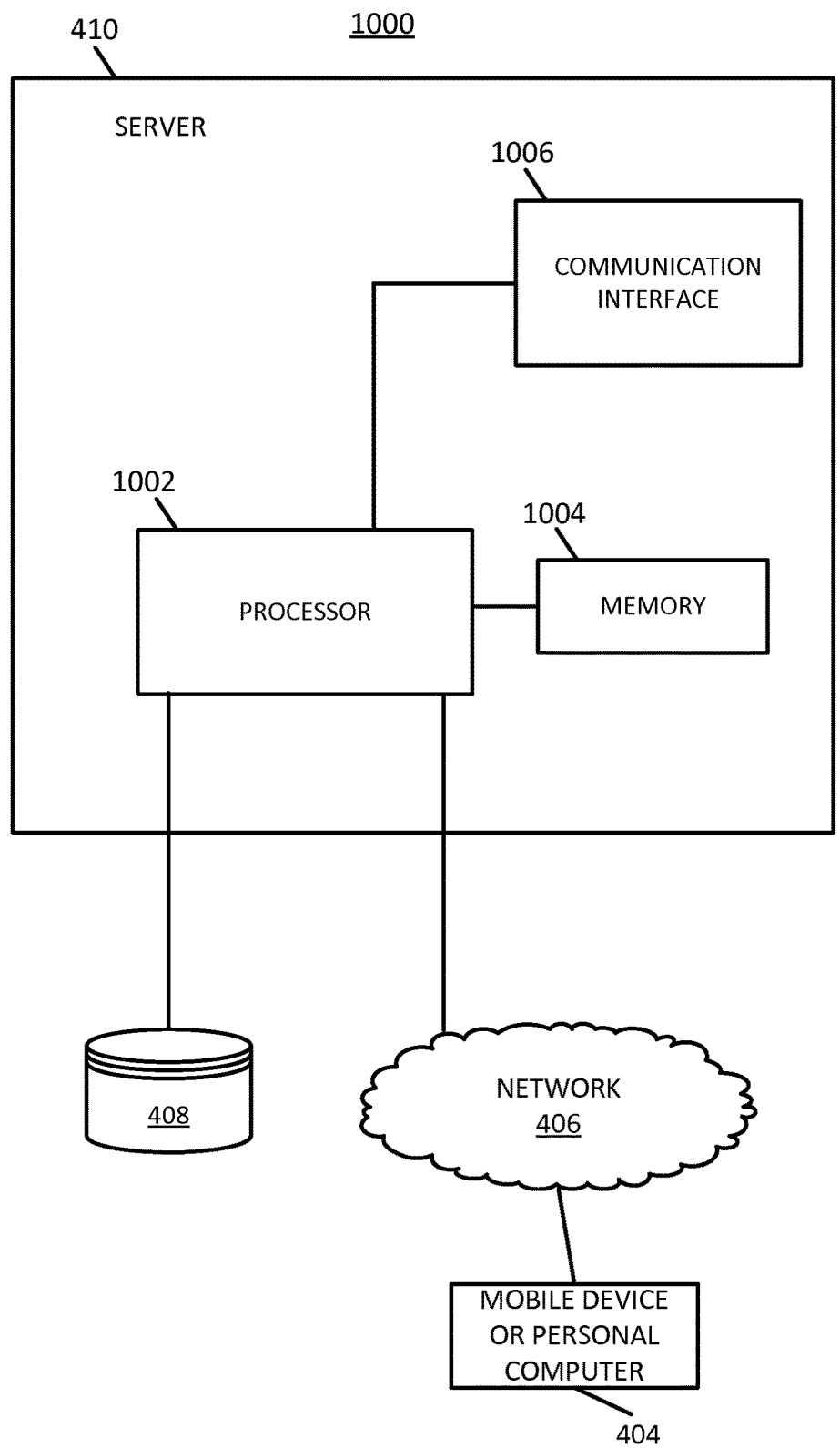
FIG. 10 illustrates an example system for updating navigational map data.
Figure 11:
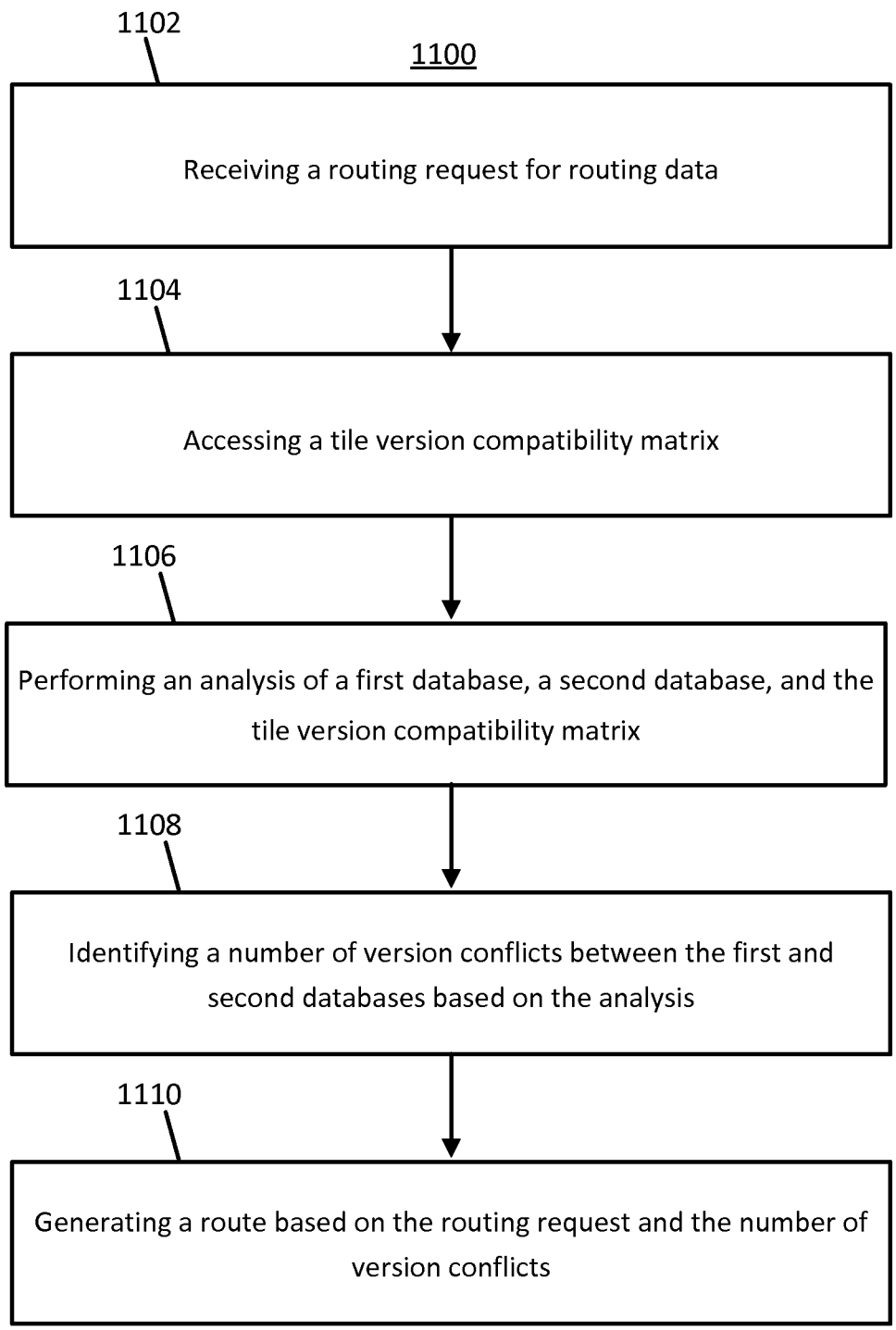
FIG. 11 illustrates an example flowchart for updating navigational map data.

FIG. 10 shows an example server 410 and processor 1002 that may be used to calculate and implement the tile version compatibility matrix according to any of the examples above. The example server in FIG. 10 includes a processor 1002, a memory 1004, and a communication interface 1006. The matrix may be sent from the server 410 to the mobile device 404 upon request, in response to a request for routing, periodically according to a time schedule, or when the navigation application is initiated (e.g., the tile version compatibility matrix may be downloaded for an entire region before any route is requested). The tile version compatibility matrix may be tile specific and downloaded along with a tile each time a tile is downloaded. FIG. 11 illustrates an example flowchart for updating navigational map data by using a tile version compatibility matrix. The acts of the flowchart of FIG. 11 may alternatively be performed by the server 410, or a group of servers. Different, fewer, or additional acts may be included.

At act 1102, the processor 1002 or communication interface 1006 receives a routing request for routing data through a network 406. At act 1104, the processor 1002 accesses a tile version compatibility matrix stored in a database. The tile version compatibility matrix may take the form of the table below:

| Current Tile | Compatible Tile Id | Compatible Tile Version |
| --- | --- | --- |
| Tile 1 | A | 1 |
|  | B | 2 |
|  | C | 1 |
| Tile 2 | A | 1 |
|  | B | 1 |
|  | D | 1 |

In the above table the tile version compatibility matrix includes multiple tiles and the tiles that are compatible with those tiles as well as their corresponding version.

At act 1106, the processor 1002 may perform an analysis of a first database, a second database, and the tile version compatibility matrix. At act 1108, the processor 1002 identifies a number of version conflicts between the first and second databases based on the analysis. In act 1110, processor 1002 generates a route based on the routing request and the number of version conflicts.

In addition to the data describe above, the database 408 may include node data records, road segment or link data records, POI data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques).

The road segment data records are links or segments representing roads, streets, or paths, as can be used in the calculated route or recorded route information for determination of one or more personalized routes, according to exemplary embodiments. The node data records are end points corresponding to the respective links or segments of the road segment data records. The road link data records and the node data records represent a road network, such as used by vehicles, cars, and/or other entities. Alternatively, for example, the database 408 may contain path segment and node data records or other data that represent pedestrian paths or areas in addition to or instead of the vehicle road record data.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The database 408 may include data about the POIs and their respective locations in the POI data records. The database 408 can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the database 408 can include event data (e.g., traffic incidents, constructions, scheduled events, unscheduled events, etc.) associated with the POI data records or other records of the database 408.

Each road segment is associated with two nodes (e.g., one node represents the point at one end of the road segment and the other node represents the point at the other end of the road segment). The node at either end of a road segment may correspond to a location at which the road meets another road, i.e., an intersection, or where the road dead-ends. The road segment data record may also include data that indicate a classification, such as a rank of a road segment that may correspond to its functional class. Example functional classes include arterial roads, collector roads, and local roads. The prerecorded path may include roads outside of the functional classification system. Alternatively, an additional functional classification (e.g., private roads, temporary roads, or personalized roads) may be added to the geographic database to distinguish the prerecorded paths from other segments. Incident rates may be assigned to road segments based on functional classification.

The database 408 may be maintained by a content provider (e.g., a map developer). By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The computing device processor 802 and/or the server processor 1002 may perform any of the calculations described herein. The computing device processor 802 and/or the server processor 1002 may include a general processor, digital signal processor, an application specific integrated circuit (ASIC), field programmable gate array (FPGA), analog circuit, digital circuit, combinations thereof, or other now known or later developed processor. The mobile device processor 802 and/or the server processor 1002 may be a single device or combinations of devices, such as associated with a network, distributed processing, or cloud computing. The computing device processor 802 and/or the server processor 1002 may also be configured to cause an apparatus to at least perform at least one of methods described above.

The memory 804 and/or memory 1004 may be a volatile memory or a non-volatile memory. The memory 804 and/or memory 1004 may include one or more of a read only memory (ROM), random access memory (RAM), a flash memory, an electronic erasable program read only memory (EEPROM), or other type of memory. The memory 804 and/or memory 1004 may be removable from the mobile device 404, such as a secure digital (SD) memory card.

The communication interface 808 and/or communication interface 1006 may include any operable connection. An operable connection may be one in which signals, physical communications, and/or logical communications may be sent and/or received. An operable connection may include a physical interface, an electrical interface, and/or a data interface. The communication interface 808 and/or communication interface 1006 provides for wireless and/or wired communications in any now known or later developed format.

In the above described embodiments, the network 406 may include wired networks, wireless networks, or combinations thereof. The wireless network may be a cellular telephone network, an 802.11, 802.16, 802.20, or WiMax network. Further, the network 406 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It is intended that the foregoing description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method for performing a routing function by a navigation device, the method comprising:
   receiving, by the navigation device, a tile compatibility listing including a series of version numbers for a geographic database including map tiles having road link data, wherein (a) each version number in the series of version numbers corresponds to a different map tile identifier and (b) the tile compatibility listing indicates compatibility of pairs of map tiles of the geographic database;
   receiving, by the navigation device, a request for routing data;
   performing, by the navigation device, an analysis of the tile compatibility listing in response to the request; and
   performing, by the navigation device, the routing function to generate the routing data, wherein performing the routing function comprises selecting at least one road link corresponding to road link data of at last one of the map tiles based on the analysis of the tile compatibility listing.

2. The method of claim 1, wherein the tile compatibility listing includes a table having at least one entry including a spatial position for the entry, the version number, and the map tile identifier.

3. The method of claim 1, further comprising determining, by the navigation device, whether a network connection is available, wherein the analysis of the tile compatibility listing depends on whether the network connection is available.

4. The method of claim 3, further comprising:
   accessing a first database when the network connection is available; and
   accessing a second database when the network connection is not available.

5. The method of claim 1, wherein the tile compatibility listing for a first tile describes consistency of the first tile and at least one second tile.

6. The method of claim 5, further comprising:
   accessing a first set of version data for the at least one second tile from the tile version compatibility listing for the first tile;
   comparing the first set of version data to a second set of version data; and
   determining a compatibility of the first and second sets of version data.

7. The method of claim 5, further comprising, when the tile compatibility listing indicates the first tile and the at least one second tile are consistent, generating a route including the selected at least one road link, wherein the route extends from the first tile to the second tile.

8. The method of claim 5, wherein when the tile compatibility listing indicates the first tile and the at least one second tile are inconsistent, generating a route including the selected at least one road link, wherein the route does not extend from the first tile to the second tile.

9. An apparatus comprising:
   a communication interface configured to receive a request including a location;
   a first database storing a first plurality of map tiles including road link data;
   a second database storing a second plurality of map tiles including road link data;
   a memory configured to store a tile compatibility listing, the tile compatibility listing comprising a series of version numbers, (a) each version number in the series of version numbers corresponds to a different map tile identifier and (b) the tile compatibility listing indicates compatibility of pairs of map tiles of the first and second databases; and a controller configured to receive a request for routing data, perform an analysis of the tile compatibility listing in response to the request, and perform a routing function to generate the routing data, the routing function comprising selecting at least one road link based on the analysis of the tile compatibility listing.

10. The apparatus of claim 9, wherein the tile compatibility listing includes a table having at least one entry including a spatial position for the entry, the version number, and the map tile identifier.

11. The apparatus of claim 9, wherein the controller is configured to, responsive to receiving the request, determine whether a network connection is available, wherein the analysis of the tile compatibility listing depends on whether the network connection is available.

12. The apparatus of claim 11, wherein the controller is configured to access the first database when the network connection is available and access the second database when the network connection is not available.

13. The apparatus of claim 11, wherein the tile compatibility listing for a first tile describes consistency of the first tile and at least one second tile.

14. The apparatus of claim 13, wherein the controller is configured to access a first set of version data for the at least one second tile stored in the tile version compatibility listing for the first tile, compare the first set of version data to a second set of version data stored by the apparatus, and determine a compatibility of the first and second set of version data.

15. The apparatus of claim 13, wherein the controller is configured, when the tile compatibility listing indicates the first tile and the at least one second tile are consistent, to generate a route including the selected at least one road link, wherein the route extends form the first tile to the second tile.

16. The apparatus of claim 13, wherein the controller is configured, when the tile compatibility listing indicates the first tiles and the at least one second tile are inconsistent, to generate a route including the selected at least one road link, wherein the route does not extend from the first tile to the at least one second tile.

17. A non-transitory computer readable medium including instructions that when executed by a routing server are operable to perform:

generating a tile compatibility listing including a series of version numbers for a geographic database wherein (a) each version number in the series of version numbers corresponds to a different map tile identifier and (b) the tile compatibility listing indicates compatibility of pairs of map tiles of the geographic database; and sending the tile compatibility listing to a navigation device, wherein, responsive to receiving a request for routing data and to determining that a connection with the routing server is not available, the navigation device performs a routing function comprising selecting at least one road link based on analysis of the tile compatibility listing to generate the routing data.

18. The non-transitory computer readable medium of claim 17, further comprising receiving location data from the navigation device, wherein the tile compatibility listing is sent in response to the location data.

19. The non-transitory computer readable medium of claim 17, further comprising determining whether a network connection to the navigation device is available, wherein the tile compatibility listing is generated in response to the network connection being available.

20. The non-transitory computer readable medium of claim 17, wherein the tile compatibility listing includes a table having at least one entry including a spatial position for the entry, the version number, and the map tile identifier.

* * * * *